(12) United States Patent
Hekstra-Nowacka et al.

(10) Patent No.: US 8,160,091 B2
(45) Date of Patent: Apr. 17, 2012

(54) SYSTEM AND METHOD FOR SYNCHRONISING A DATA PROCESSING NETWORK

(75) Inventors: Ewa Hekstra-Nowacka, Waalre (NL); Peter Van Den Hamer, Waalre (NL); Cornelis Hermanus Van Berkel, Heeze (NL); Andrei Radulescu, Eindhoven (NL)

(73) Assignee: ST-Ericsson SA, Geneva (CH)

( * ) Notice: Subject to any disclaimer, the term of this patent is extended or adjusted under 35 U.S.C. 154(b) by 845 days.

(21) Appl. No.: 11/817,791

(22) PCT Filed: Mar. 1, 2006

(86) PCT No.: PCT/IB2006/050632
§ 371 (c)(1),
(2), (4) Date: Oct. 24, 2008

(87) PCT Pub. No.: WO2006/092764
PCT Pub. Date: Sep. 8, 2006

(65) Prior Publication Data
US 2009/0172198 A1    Jul. 2, 2009

(30) Foreign Application Priority Data
Mar. 4, 2005   (EP) .................................... 05101717

(51) Int. Cl.
*H04L 12/43*       (2006.01)
(52) U.S. Cl. ........................ 370/458; 370/350; 709/248
(58) Field of Classification Search .................. 370/252, 370/384, 396, 437, 496, 324, 503, 458, 350; 375/365; 709/248
See application file for complete search history.

(56) References Cited

U.S. PATENT DOCUMENTS

| 4,301,532 A | 11/1981 | Janetzky |
| 6,026,133 A | 2/2000 | Sokoler |

OTHER PUBLICATIONS

Li, C-S; et al "Distributed Source-Destination Synchronization" 1996 IEEE International Conference on Communications (ICC). Converging Technologies for Tomorrow's Applications. vol. 3, Jun. 23, 1996, pp. 1341-1347.

*Primary Examiner* — Dang Ton
*Assistant Examiner* — Mandish Randhawa

(57) ABSTRACT

A data processing system according to the invention comprising a group of at least a first and a second module, wherein each module has a data processing facility, a clock for timing data transmissions from the module to another module, a time-slot counter for counting a number of time slots which are available for transmission of data. The modules have a first operational state wherein the counted number of time slots is less than or equal to a predetermined number, in which operational state data transmission is enabled, and a second operational state wherein the number is in excess of the predetermined number, in which second operational state data transmission is disabled, Each module has a notifying facility for notifying when it is in the second operational state. The data processing system has at least one detecting facility that detects whether the other modules have notified that they are in the second operational state and the modules each have an initialization facility for resetting the time-slot counter when the module is in the second operational state and each of the other modules has notified that it is in the second operational state.

6 Claims, 2 Drawing Sheets

SYSTEM AND METHOD FOR SYNCHRONISING A DATA PROCESSING NETWORK

Figure 1:
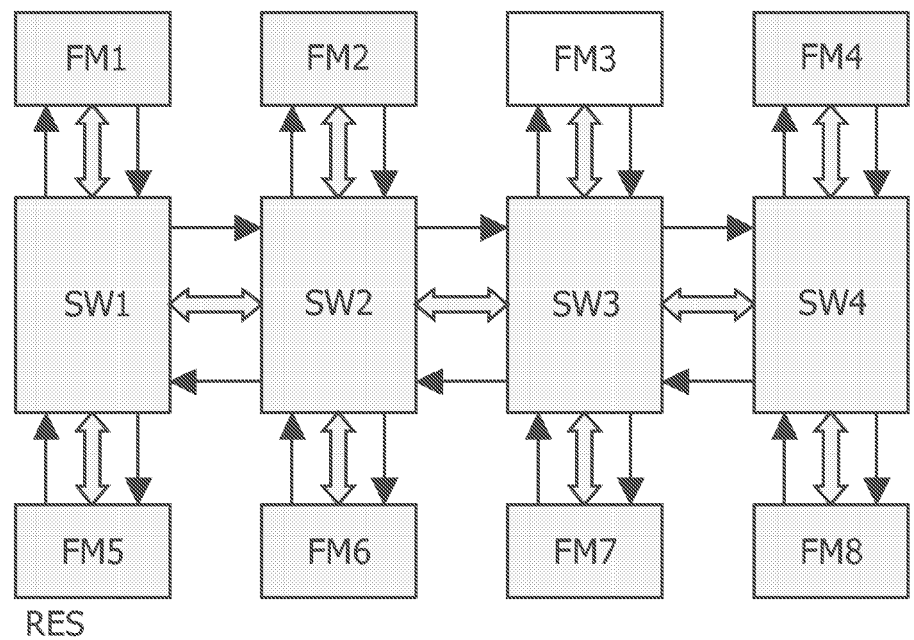

Future data processing systems will contain a large plurality of modules. Using modules which have a clear function and a well defined interface facilitates a rapid development of those systems. An example of such an application is a mobile phone. Modules are for example RF-modules, error coding/decoding modules, signal coding/decoding modules, a general purpose processor allowing to implement various user defined features in software, and routers or switches for guiding the data traffic from between the other modules. Implementation in the form of a network is advantageous, as networks can relatively easily be scaled to an arbitrary size. Switches or routers of the network and the other modules may be incorporated in mutually different chips. As an alternative to a network topology the modules may be arranged on one or more buses or have point to point connections. Both in a bus and in a network topology various data streams may share a common communication path between two modules, also denoted as link.

Now assume that data transmission across the system is arranged in a streaming fashion, i.e. data is periodically transmitted. To allow flaw-less coexistence of various streams, these streams should be mutually independent, i.e. adding an extra stream should not affect the existing streams.

If all modules in the system are controlled by exactly the same clocks, it is possible to arrange the transmissions through the network (i.e. to schedule them) such that data of different streams does not collide in the network. However, in various practical situations, all modules are using the same frequency only nominally. The frequency may also vary in time due to temperature dependent drift. This means their actual frequency values are allowed to be slightly different, within a given tolerance (plesiochronous links). Or in other words, each device/switch/transmitter its has own independent clock with bounded frequency error.

This in long run can result in buffer overflows/underflows in relatively slow switches (the reading rate is lower than the writing rate) or relatively fast switches (the reading rate is higher than the writing rate), respectively, as well as in transmission clashes between data belonging to different streams, which share the same links. It is possible to overcome these problems by an exchange of flow control messages between the modules. An exchange of flow control messages can be very costly however in terms of power consumption, in particular when using serial links. Consider for example a 2.5 GHz 10b/8b PLL based serial link. Such a link consumes power when it is active, or when it is activated after being in a low-power mode. A typical activation time is in the order of thousands of ns (e.g., 2000 ns). To only send a flow control message of e.g., 32 bits (16 ns), the link would need to consume power for 2016 ns, which is too much.

Another known approach, described in U.S. Pat. No. 6,026,133 is to use a central reference clock to adjust the fast local clocks of the modules. The adjustment is performed by controlling the voltage of a voltage-controlled oscillator. Such an arrangement however requires a phase locked loop in each module, which complicates the design.

It is a purpose of the present invention to provide a relatively simple system and a method for operating a system in which buffer overflows/underflows are prevented without necessitating flow-control messages. According to the invention this purpose is realized in a system as claimed in claim 1. The purpose is further realized in a method for operating a system according to claim 5.

In the system and method according to the invention the data transmission pace across the whole system is adapted to the pace of the slowest link. To that end the local time in all modules is corrected at regular intervals to compensate the difference to the slowest clock/switch/link. In these intervals, so between the correction instances a transmission of a data portion, which does not exceed a prescribed maximum, on all links can take place. It is assumed that setting such portion of data on the physical link requires N clock cycles. Hence, after each N cycles of the local clock the modules waits for alignment with the other modules in the group. The synchronization algorithm works as follows: At the initialisation of a link transmission, each switch counts N time-slots and sends a signal over the return link to all its direct active neighbours that it is Ready. A time slot has a fixed relation to the clock cycle of the local clock.

When the switch has received Ready feedback from all its direct active neighbours and is finished with its own counting of N time-slots, it will start again to count N time-slots, and again when this is completed it will issue a Ready feedback to its neighbours. This step will be repeated.

In this way overflow/underflow or collisions between various streams are prevented in an efficient manner.

Preferably the cycle time of the clocks of the modules differs by at most a predetermined fraction of the average cycle time, and the duration of the predetermined number of time slots is less than the reciprocal value of said fraction. This fraction is defined as the maximum difference in clock cycle time ($\Delta T$) divided by the average clock cycle time (T).

By performing an initialization of the time-slot counter after $T/\Delta T$ it is prevented that one module can provide more data than the other can handle.

Most preferably the duration of the predetermined number of time slots is greater than one quarter of the reciprocal value and is less than three quarters of the reciprocal value. By employing a duration less than three quarters it is prevented that a deviation from the allowed tolerance would immediately result in overflow. A duration less than one quarter of the inverse ratio would result in a relatively large overhead.

Surprisingly it is not necessary that each module of the system is notified by each other module. In an embodiment the system according to the invention, has a further group of modules as specified in claim 1, wherein modules from a subset of the group notify modules from a subset of the further group when they are in the second operational state, and wherein modules from a subset of the further group notify modules from a subset of the group when they are in the second operational state. Also in this case an overflow/underflow free data traffic can be realized.

A resample strategy, known as such, may be used to resample the data received from another modules. Such a strategy is described for example in U.S. Pat. No. 5,644,604.

Figure 2:
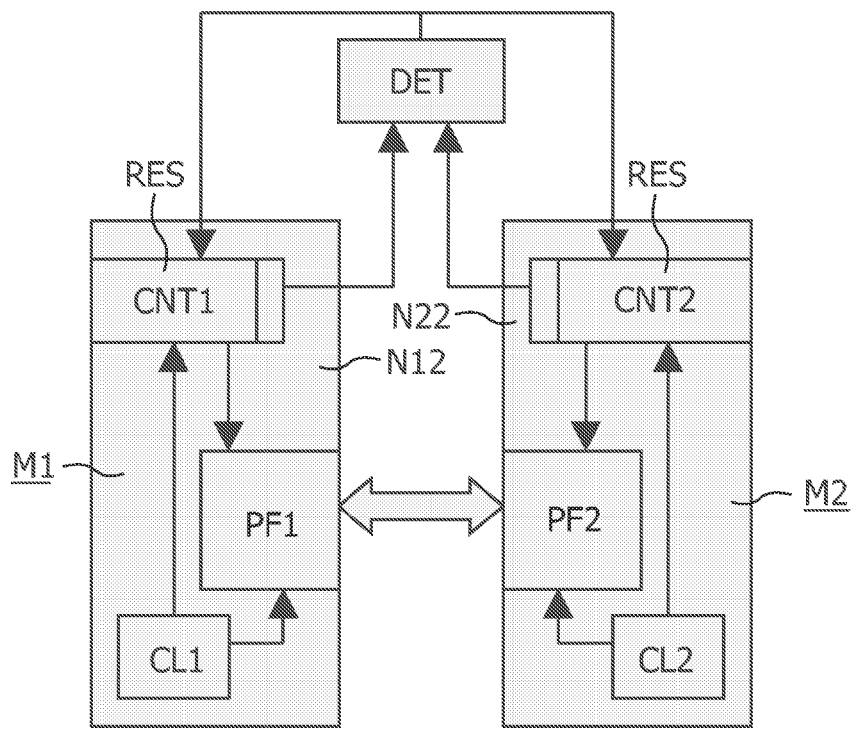
Figure 3:
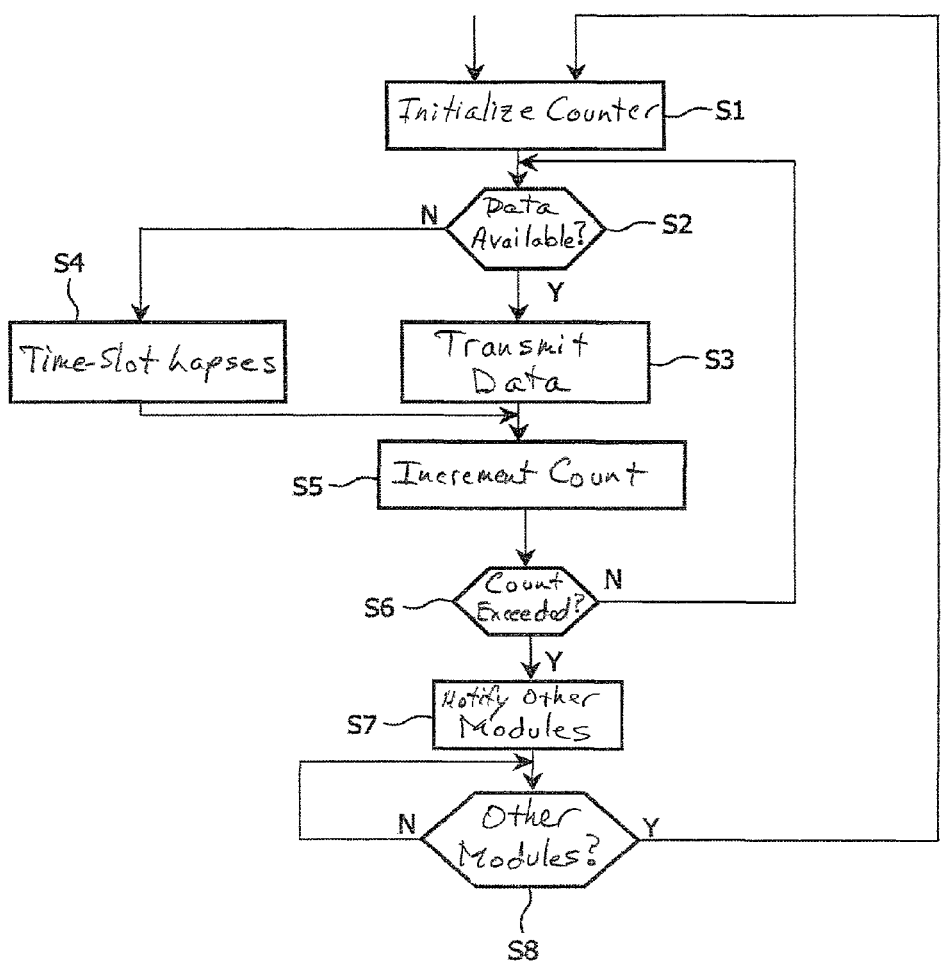
Figure 4:
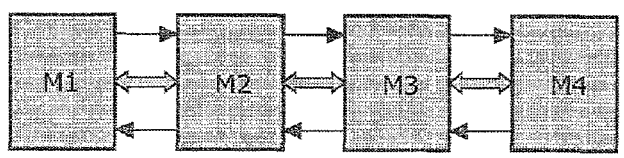

These and other aspects of the invention are described in more detail with reference to the drawings. Therein:

FIG. 1 shows a first embodiment of a data processing system according to the invention, FIG. 2 shows in more detail a second embodiment of the data processing system according to the invention, FIG. 3 illustrates a method according to the invention, FIG. 4 illustrates a further embodiment according to the invention.

FIG. 1 schematically shows a data processing system comprising a plurality of modules. In the embodiment shown the data processing system comprises a network with four switches SW1, SW2, SW3, and SW4. The network switches are arranged in a chain like fashion, i.e. switches SW1 and SW2 can exchange data with each other, switches SW2 and SW3 can exchange data with each other and switches SW3 and SW4 can exchange data with each other. Data exchange channels are symbolically indicated by the symmetrical block arrows. The network switches are further coupled to functional modules FM1, . . . , FM8. Each module has a data processing facility. E.g. the switches have data routing and buffering facilities, and the functional modules provide facilities for mathematical and logical operations, storage etc.

For clarity now FIG. 2 shows a further system with two modules M1, M2 in more detail. Although the topology is different, the more detailed description of the modules is also relevant for the modules of FIG. 1. The modules therein have mutually independent clocks CL1, CL2. In the embodiment shown the clock is a local clock generator, but it may also be an input that receives a clock signal. The clock serves for timing data transmissions from the module to another module. As shown in FIG. 2, each of the modules M1, M2 has a time-slot counter CNT1, CNT2 resp. for counting a number of time slots which are available for transmission of data. At power-up or reset of the system the counters are initialized at count 0. The modules have a first operational state wherein the counted number of time slots is less than or equal to a predetermined number. In this first state data transmission is enabled. Data is transmitted synchronously with the local clock of the module. The local clock may be transmitted separately, or may be transmitted embedded with the data, such as in the 10b/8b encoding. The modules have a second operational state wherein the counted number of time slots is in excess of the predetermined number. In this second operational state data transmission is disabled.

Each module has a notifying facility for notifying when it is in the second operational state. In the embodiment shown module M1 has notifying signal line N12 and module M2 has notifying signal line N22.

The processing system has a detecting facility DET for detecting whether the other modules have notified that they are in the second operational state. In the embodiment shown the modules M1, M2 share one detection facility DET. Alternatively each of the modules may have a separate detection facility. The detection facility may be for example a AND-gate, which gives a logically signal "1" if both modules have notified with a logical "1" that they are in the second operational state. Alternatively the detection facility may be an OR-gate, which gives logically signal "0" if both modules have notified with a logical "0" that they are in the second operational state. It is clear that the detection facility may receive notification signals from an arbitrary number of modules.

The time slot counters CNT1, CNT2 have a reset input RES which is coupled to the output of the detection facility. Upon a signal from the detecting facility DET, indicative that each module is in the second operational state the time slot counter is initialized at 0. Consequently the module assumes again the first operational state and can resume transmitting data.

FIG. 3 schematically shows the processing steps for one of the modules of the group. The other modules of the group are operated in the same way.

In step S1 a counter is initialized for counting a number of time slots. The time slots have a fixed size which is related to the clock period of a local clock. For example the time slots have a duration of a fraction of a clock cycle, a single clock cycle or a plurality of clock cycles.

In step S2, executed at each time slot it is determined whether data is available for transmission to another module, and if that is the case said data is transmitted in step S3. Alternatively data may be received. Although the data is in the first place always transmitted to a module of the group, it may be further transmitted to a module outside the group. If no data is available, the time-slot lapses without transmission in step S4.

At step S5, after the time-slot has lapsed, or at another moment within the time slot the count for the number of time slots is incremented.

In step S6 it is determined whether the counted number is in excess of a predetermined number. If this is not the case the method continues with step S2.

If the counted number does excess the predetermined number this is notified to the other modules of the group in step S7. This can be communicated by a signal or a message for example.

In step S8 the module waits until the other modules of the group have informed that the predetermined number is exceeded.

If each other module of the group has notified that it has completed its time-slot cycle the method is repeated from step S1.

It is not necessary that each module needs to have a notification from each of the other modules that it is in the second operational state. It suffices that the initialization of the time-slot counter of a module depends on the notifications from those modules with which it directly communicates. Consider for example the linear array of 4 modules shown in FIG. 4. This embodiment has the following notification dependency: module M1 notifies module M2, module M2 notifies modules M1 and M3, module M3 notifies modules M2 and M4 and module M4 notifies modules M3. The system in FIG. 4 can be considered as a system having a further group of modules M3,M4 wherein modules from a subset M2 of the group M1,M2 notify modules from a subset M3 of the further group M3,M4 when they are in the second operational state, and wherein modules from a subset M3 of the further group M3,M4 notify modules from a subset M2 of the group M1, M2 when they are in the second operational state. By way of example suppose that module M1 has a relatively slow clock, and needs a process time of 10 time-units of a reference clock to reach the predetermined count of time-slots, and that the other modules only need 9 time units of the same reference clock. The following table shows at which time instants the time slot counters are initialized in this system.

|  | Module | | | |
| --- | --- | --- | --- | --- |
|  | M1 | M2 | M3 | M4 |
| process time | 10 | 9 | 9 | 9 |
| complete 1 | 10 | 9 | 9 | 9 |
| Init 2 | 10 | 10 | 9 | 9 |
| complete 2 | 20 | 19 | 18 | 18 |
| Init 3 | 20 | 20 | 19 | 18 |
| complete 3 | 30 | 29 | 28 | 27 |
| Init 4 | 30 | 30 | 29 | 28 |

In the table it can be seen that module M1 has given its notification after 10 time units and the other modules after 9 time units. In view of the notification dependency module M2 waits for module M1 and both initialize their time slot counter at time 10. M3 and M4 initialize at time 9. In view of their processing time the modules will give a next notification at the times complete 2. M1 is finished at time 20. Because M2 has waited with initialization for module M2 it is now finished at time 19. The other two modules are finished at time 18. The slot counter of M1 is initialized at time 20. The slot counter of M2, which waits for M1, is also initialized at time 20. Although M3 has given its own notification at time 18 it initializes its time slot counter only at time 19 when it has also received the notification from M2. M4 is completed at time 18 and has received notification from M3 at the same time. Hence, M4 initializes its time slot counter at time 18. At the row complete 3 it is indicated at which times the modules have reached the second operational state for the third time. It can now be seen that module M4 will not immediately reset its time slot counter, but will wait one time unit as it still has to receive the notification from module M3. In this way the data-traffic between each of the modules is synchronized, so that buffer over/underflow is prevented.

It is remarked that the scope of protection of the invention is not restricted to the embodiments described herein. Parts of the system may implemented in hardware, software or a combination thereof. Neither is the scope of protection of the invention restricted by the reference numerals in the claims. The word 'comprising' does not exclude other parts than those mentioned in a claim. The word 'a(n)' preceding an element does not exclude a plurality of those elements. Means forming part of the invention may both be implemented in the form of dedicated hardware or in the form of a programmed general purpose processor. The invention resides in each new feature or combination of features.

The invention claimed is:

1. A data processing system comprising a group of at least a first and a second module, wherein each module has a data processing facility, a mutually independent clock for timing data transmissions from a module to another module, and a time-slot counter for counting a number of time slots which are available for transmission of data, the modules having a first operational state wherein the counted number of time slots is less than or equal to a predetermined number, in which operational state data transmission is enabled, and a second operational state wherein the number is in excess of the predetermined number, in which second operational state data transmission is disabled, each module having a notifying facility for notifying when said module is in the second operational state, the data processing system having a detecting facility for detecting whether all other modules have notified that said all other modules are in the second operational state, the modules having an initialization facility for resetting the time-slot counter when the module is in the second operational state and each of the other modules has notified that said each of the other modules is in the second operational state.

2. The system according to claim 1, wherein a cycle time of the clocks of the modules differs by at most a predetermined fraction of an average cycle time, and the duration of the predetermined number of time slots is less than a reciprocal value of said fraction.

3. The system according to claim 2, wherein the duration of the predetermined number of time slots is greater than one quarter of the reciprocal value and is less than three quarters of the reciprocal value.

4. The system according to claim 1, having a further group of modules as specified in claim 1, wherein modules from a first subset of the first, second and third modules notify modules from a first subset of the further group when they are in the second operational state, and wherein modules from a second subset of the further group notify modules from a second subset of the first, second and third modules when they are in the second operational state.

5. Method for operating a data-processing system, comprising a group of at least a first and a second module having mutually independent clocks, which method comprises for each module the steps of
   a. initializing a counter for counting a number of time slots,
   b. at each time slot determining whether data is available for transmission to another module, and if that is the case transmitting said data,
   c. at each time slot incrementing the count for the number of time slots,
   d. repeating the method from step b if the counted number is not in excess of a predetermined number,
   e. if the counted number is in excess of the predetermined number notifying this to the other modules of the group,
   f. waiting until the other modules of the group have notified that the predetermined number is excessed, and
   g. repeating the method from step a.

6. A data processing system comprising:
first, second, and third modules, each module comprising:
   a data processing facility;
   a mutually independent clock for timing data transmissions from a module to another module; and
   first and second time-slot counters for counting a number of time slots which are available for transmission of data, wherein the modules have a first operational state wherein the counted number of time slots is less than or equal to a predetermined number in which operational state data transmission is enabled, and a second operational state wherein the number is in excess of the predetermined number in which second operational state data transmission is disabled,
wherein the second module further comprises:
   a first notifying facility for notifying the first module when the second module is in the second operational state and a second notifying facility for notifying the third module when the second module is in the second operational state, the first notifying facility operating independently of the second notifying facility;
   a first detecting facility for detecting whether the first module has notified that it is in the second operational state, and a second detecting facility for detecting whether the third module has notified that it is in the second operational state; and
   a first initialization facility for resetting the first time-slot counter when the first and second modules are in the second operational state, and a second initialization facility for resetting the second time-slot counter when the second and third modules are in the second operational state, the first initialization facility operating independently of the second initialization facility.

* * * * *